Oct. 11, 1938.  G. R. PFLASTERER  2,133,177

RAILWAY TRACK CIRCUIT APPARATUS

Filed May 11, 1935

INVENTOR
George R. Pflasterer
BY
HIS ATTORNEY

Patented Oct. 11, 1938

2,133,177

UNITED STATES PATENT OFFICE 2,133,177

RAILWAY TRACK CIRCUIT APPARATUS

George R. Pflasterer, Swissvale, Pa., assignor to The Union Switch & Signal Company, Swissvale, Pa., a corporation of Pennsylvania Application May 11, 1935, Serial No. 21,020

30 Claims. (Cl. 246—41)

My invention relates to railway track circuit apparatus, and has for an object the provision of novel and useful apparatus for improving the shunting sensitivity of the track circuit.

I will describe four forms of apparatus embodying my invention, and will then point out the novel features thereof in claims.

Figure 1:
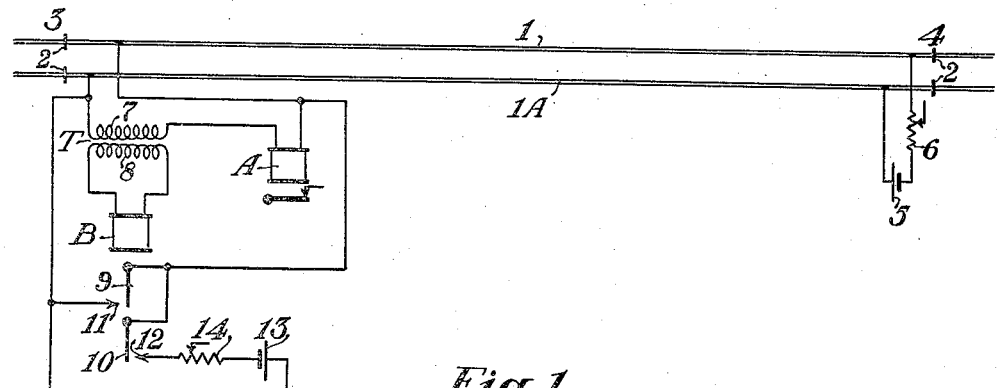
Figure 2:
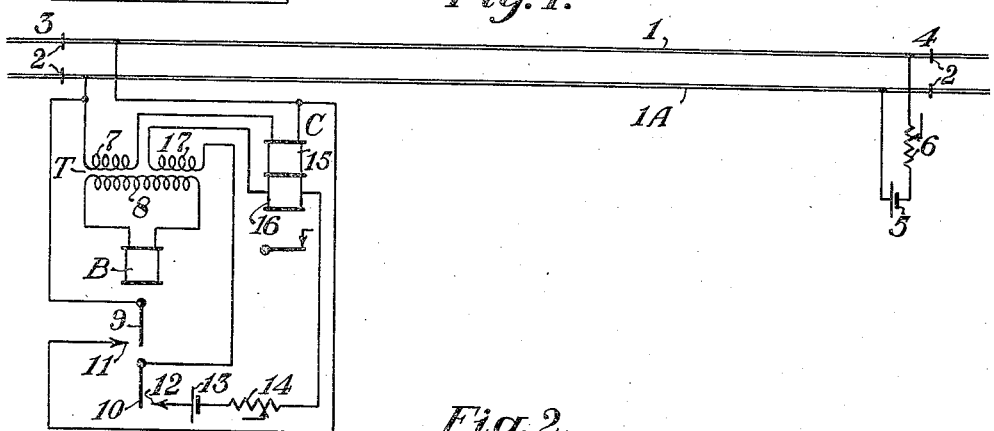
Figure 3:
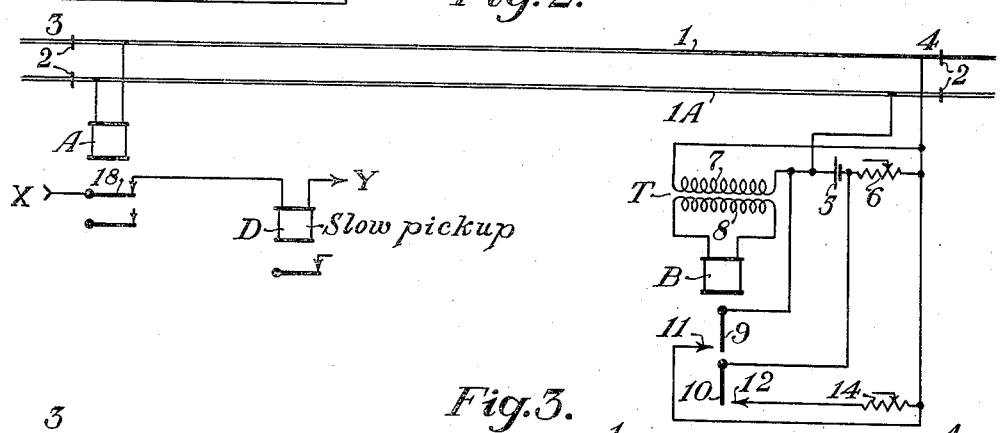
Figure 4:
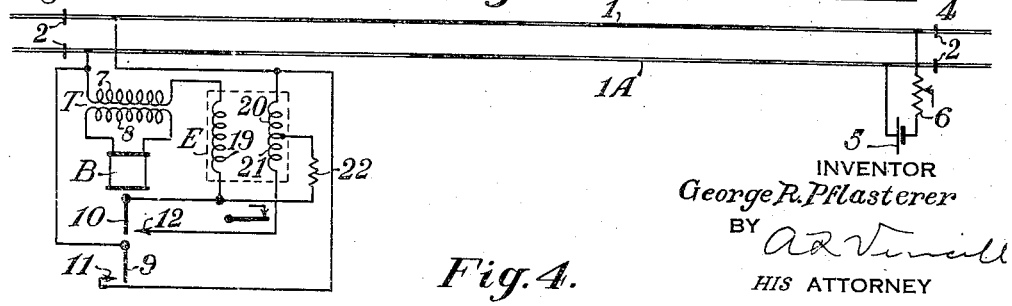

In the accompanying drawing, Fig. 1 is a diagrammatic view illustrating one form of track circuit apparatus embodying my invention. Fig. 2 is a diagrammatic view illustrating a modified form of the apparatus shown in Fig. 1, and also embodying my invention. Fig. 3 is a diagrammatic view illustrating another form of apparatus embodying my invention wherein improvements have been applied to the battery end of the track circuit rather than at the relay end. Fig. 4 is still another form of apparatus embodying my invention wherein improvements have been applied to the relay end of the track circuit when utilizing a track relay of a form different from those shown in Figs. 1, 2 and 3.

In each of the several views similar reference characters refer to similar parts.

Referring to Fig. 1, the reference characters 1 and 1A designate the rails of a stretch of railway track which are formed by insulated joints 2 into a track section 3—4. The track section 3—4 is provided with a track circuit which comprises as its essential elements the rails bonded in the customary manner, a source of current connected across the rails at one end of the section, and a track relay receiving energy from the rails at the other end of the section. As here shown, the source of current for the track circuit is a track battery 5 which has one terminal connected with the rail 1A and its opposite terminal connected with the rail 1 through a current-limiting device 6 here shown as a resistor. The reference character A designates a relay here shown as a direct current neutral relay of the usual type and which is connected across the rails 1 and 1A in series with the primary 7 of a transformer T. The secondary 8 of the transformer T is connected with the operating winding of a device B. The device B is here shown as a relay and is referred to at times, hereinafter, as an impulse or auxiliary relay.

Relay B may be of the polarized type having polar armature contacts 9 and 10 which are normally biased to a center or neutral position. The contacts 9 and 10 cooperate with fixed contacts 11 and 12, respectively, in such manner that contact 9—11 is closed when the armature is swung to the left, and contact 10—12 is closed when the armature is swung to the right.

Associated with relay B is an additional source of current designated by the reference character 13 and here shown as a battery. A device 14, here shown as a resistor, is provided to control the current flow from battery 13.

The ampere-turn energization of the relay A usually will be so adjusted that the relay will be receiving sufficient energy from battery 5 to hold it up but not sufficient energy to cause the relay to pick up. That is, the resistor 6 will be so adjusted that the ampere-turn energization of relay A will be at some point above the release value of the relay but below the pick-up value. It follows, therefore, that a train shunt of relatively high resistance will release the relay A. Furthermore, when section 3—4 is occupied by a train and contacts 9 and 10 of relay B move to the left, as will be explained more in detail hereinafter, an auxiliary shunt path across the track circuit will be closed by the closing of contact 9—11. When the train leaves section 3—4, the relay B will move its armature to the right, as will be explained more in detail hereinafter, so that contact 10—12 will become closed. When contact 10—12 is closed, the relay A will receive additional energy from the battery 13 which, together with the normal holding current from battery 5, will be sufficient to pick up the relay A. The resistor 14 will usually be so adjusted that the current from battery 13 will be just sufficient to pick up the relay A provided it is also receiving its normal holding current from the battery 5. Thus relay A is provided with a holding circuit which includes resistor 6, rails 1 and 1A and primary 7, and with a circuit which aids pick up which circuit includes resistor 14, contact 12 and primary 7.

The operation of the track circuit apparatus is as follows: When section 3—4 is unoccupied, contacts 9 and 10 of relay A are in their neutral position, as shown in the drawing, and relay A is held up by current from battery 5.

I shall now assume that a train enters section 3—4. When this occurs, the shunt afforded by the wheels and axles of such train will suddenly reduce the amount of current flowing in primary 7 of transformer T, and this sudden change of current will induce an impulse of current in secondary 8 of such polarity as to cause armature contact 9 to move to the left so that contact 9—11 will become closed. When contact 9—11 is closed, a shunt path will be closed across the rails of section 3—4 which shunt path will insure the release of relay A and will still further reduce the current in primary 7. This further reduction of current in primary 7 will induce an additional impulse of current in secondary 8 of such polarity as will tend to maintain armature contact 9 in its left-hand position. When the impulse of current induced in secondary 8 has been dissipated, the armature contact 9 will return to its neutral position.

It will be noted that the rails 1 and 1A, in addition to being shunted by the wheels and axles of the train, will also be momentarily shunted by the closing of contact 9—11 of relay B. Since relay A is normally energized by current of a value much lower than is usually provided for this type of track relay, the dual shunt of the train and the auxiliary shunt path just described will insure a more positive release of the relay A.

When the train leaves section 3—4, there will be a sudden increase in the amount of current supplied to the primary 7 of transformer T and this sudden change in the primary current will cause an impulse to be induced in secondary 7 of such polarity as to cause the armature contact 10 to move to the right. When the armature contact 10 moves to the right, contact 10—12 will become closed to apply energy from battery 13 to the operating winding of relay A through primary 7 of transformer T. This increase in current in primary 7 will induce another impulse of current in secondary 8 of such polarity as will tend to maintain armature contact 10 in its right-hand position. As hereinbefore explained, the current from battery 13 will be so regulated that the combined currents received by relay A from battery 13 and from battery 5 will be of sufficient magnitude to pick up relay A. When the impulse induced in primary 8 has been expended, the armature of relay B will return to its neutral position and all parts will again be in the normal condition.

The operation of relay B is independent of the energy level at the right-hand end of the section 3—4, and is dependent only on the change in the amount of current supplied to transformer T when a train enters or leaves the section. It follows that changes in the characteristics of the track circuit due to variations in weather or other conditions will not affect the operation of this relay. During dry weather conditions when good shunting action is necessary to cause relay A to release in response to a train entering the section, relay B will be actuated by a relatively poor train shunt to place an auxiliary shunt on the track circuit because of the relatively large change in the amount of current supplied to this relay as the train enters the section; whereas, during wet weather conditions when relay B may not be so sensitive, relay A will be released by a relatively poor shunt. The combination of the two relays A and B provides, therefore, for more reliable shunting under all possible conditions of track.

Referring now to Fig. 2, the reference character C designates a track relay having a holding winding 15 and a pick-up winding 16. The holding winding 15 is connected across the rails 1 and 1A in series with primary 7 and is energized from track battery 5 with sufficient energy to hold up the relay but not sufficient energy to cause the relay to pick up. The pick-up winding 16 is connected in series with another primary 17 of transformer T and is energized by auxiliary battery 13 when contact 10—12 of relay B is closed. The apparatus illustrated in Fig. 2 operates in a manner similar to that just described for the apparatus shown in Fig. 1. That is, when a train enters section 3—4, the decrease of current in primary 7 will induce a current in relay B of such polarity that armature contact 9 will move to the left and momentarily close contact 9—11. When contact 9—11 is closed an auxiliary shunt path will be closed across the rails of the track section. This shunt path will aid the train shunt in releasing relay C and will also induce an additional impulse of current in relay B such as will tend to maintain contact 9—11 closed. When the train leaves section 3—4, the impulse of current of opposite polarity induced in relay B will cause armature contact 10 to move to the right thus closing contact 10—12. When contact 10—12 is closed, a circuit which aids pick-up of relay C will be closed which circuit includes battery 13, resistor 14, pick-up winding 16 and primary 17. The closing of contact 10—12 will also induce an additional impulse of current in relay B such as will tend to maintain contact 10—12 closed. As long as contact 10—12 is closed, the pick-up winding 16 will be energized from battery 13 by current of sufficient magnitude to cause relay C to pick up provided the relay is receiving its normal current from the track battery 5 through the holding circuit.

Referring now to Fig. 3, it will be noted that the impulse relay B has been applied to the battery end of the section 3—4 rather than to the relay end of the section. The reference character D designates a slow-acting device here shown as a relay having a slow-pick-up characteristic. The relay D may be controlled over a circuit including a front contact 18 of relay A which circuit may be connected to a suitable source of energy the terminals of which are designated by the reference characters X and Y. The relay D may be provided to prevent circuits which may be controlled by the track relay from becoming closed during possible momentary losses of shunt while the section 3—4 is occupied by a train. It is contemplated that such circuits, not shown in the drawing, as may be controlled by the track relay A will be controlled by the slow pick-up relay D, or by both relays A and D, so that if relay A picks up momentarily with the section 3—4 occupied by a train, such circuits will not be immediately closed. Although I have shown the relay D in Fig. 3 only, this relay may also be applied in a similar manner to the apparatus shown in each of the other figures.

The apparatus shown in Fig. 3 operates in a manner similar to that just described for the apparatus illustrated in Figs. 1 and 2. That is, when a train enters section 3—4, an impulse of current is induced in relay B which will cause armature contact 9 to move to the left so that contact 9—11 will become closed. When contact 9—11 is closed, an auxiliary shunt path will be closed across the track rails 1 and 1A. This shunt path will aid the train shunt in releasing the relay A and will induce another impulse of current in relay B of such polarity as will tend to maintain contact 9—11 closed.

When the train leaves section 3—4, the impulse of current induced in the relay B will cause armature contact 10 to move to the right so that contact 10—12 will become closed. When contact 10—12 is closed so that the circuit which aids pick-up of relay A is established, the relay A will be picked up and the relay B will receive an additional impulse of current of such polarity as will tend to maintain contact 10—12 closed. This circuit for relay A includes the branch path through the resistor 14 which resistor will be so adjusted that the current from battery 5 through the resistor 14 when added to the normal current supply to the relay A through resistor 6, will be sufficient to cause the relay A to pick up. As explained for the apparatus shown in Figs. 1 and 2, the relay A will normally receive from battery 5 only sufficient current to hold up the relay but not sufficient to cause the relay to pick up. Thus, relay A is provided with a holding circuit which includes the resistor 6 and the rails 1 and 1A, and with a pick-up circuit which includes, in addition, the resistor 14 and the rails 1 and 1A as well as the contact 10—12 of the relay B.

Referring now to Fig. 4, the reference character E designates a track relay of the type wherein the ampere-turn energization of the relay may be controlled by regulating the number of turns in the operating winding of the relay rather than by regulating the current supplied to the relay. The relay E is provided with a holding circuit which includes the rails 1 and 1A of the section and one winding 19, as well as a portion 20 of the other winding and a resistor 22; and also with a pick-up circuit which includes the rails 1 and 1A and one winding 19 as well as both portions 20 and 21 of the other winding. The resistor 22 and the winding 20 will usually be so chosen that the relay E will normally receive sufficient energization to hold up the relay but will not receive sufficient energization to cause the relay to pick up. The relay E, therefore, will be released by a train shunt of relatively high resistance.

When a train enters section 3—4, the relay B will receive an impulse of current which will cause contact 9—11 to become closed so that an auxiliary shunt path will be closed across the track rails which shunt path will aid the train shunt in releasing the relay E. When the train leaves the section, the relay A will receive an impulse of current of opposite polarity so that contact 10—12 will become closed. When contact 10—12 is closed, the full operating winding including coils 19, 20 and 21 will be connected across the rails so that the ampere-turn energization of relay E will be sufficient to cause the relay to pick up. As soon as contact 10—12 becomes opened, the winding 21 will be disconnected so that the resistor 22 will be effective for limiting the energization of the relay to its holding value.

From the foregoing description of track circuit apparatus embodying my invention, it is apparent that I have provided a track relay so controlled that it will be released by a train shunt of relatively high resistance. Furthermore, I have provided apparatus which will apply an auxiliary shunt to the track circuit in addition to the usual train shunt, when a train enters the track circuit. An important feature of my invention is the provision of shunting apparatus which is highly effective during dry weather conditions when it is usually difficult to obtain release of the track relay.

Although I have herein shown and described only a few forms of apparatus embodying my invention, it is understood that various changes and modifications may be made therein within the scope of the appended claims without departing from the spirit and scope of my invention.

Having thus described my invention, what I claim is:

1. In combination, a section of railway track, a source of current connected across the rails of said section, a track relay and an impulse relay both receiving energy from said rails, means for controlling the ampere-turn energization of said track relay in such manner that normally the energization is sufficient to hold up the relay but is insufficient to cause the relay to pick up, means controlled by said impulse relay effective when a train enters the section for closing a shunt path across the rails of said track section to aid the release of said track relay, and other means also controlled by said impulse relay effective when the train leaves said section to increase the energization of said track relay to cause pick-up thereof.

2. In combination, a section of railway track, a source of current connected across the rails of said section, a track relay and an impulse relay both receiving energy from said rails, means for controlling the ampere-turn energization of said track relay in such manner that normally the energization is sufficient to hold up the relay but is insufficient to cause the relay to pick up, means including a contact of said impulse relay effective to close a shunt path across the rails of said section when a train enters the section to aid the release of said track relay, and means including another contact of said impulse relay effective when the train leaves said section to increase the energization of said track relay to cause pick-up thereof.

3. In combination, a section of railway track, a source of current connected across the rails of said section, a track relay receiving energy from said rails, means for controlling the ampere-turn energization of said track relay in such manner that normally the energization is sufficient to hold up the relay but is insufficient to cause the relay to pick up, a device also receiving energy from said rails and having a normal condition but capable of assuming one or another of two different conditions according as a train is entering or leaving said section respectively, means for shunting the rails of said section effective when said device is in said one condition, and means for increasing the energization of said track relay to cause pick-up thereof effective when said device is in said other condition.

4. In combination, a section of railway track, a source of current connected across the rails of said section, a track relay receiving energy from said rails, means for controlling the ampere-turn energization of said track relay in such manner that normally the energization is sufficient to hold up the relay but is insufficient to cause the relay to pick up, a device having contacts normally biased to a neutral position but operable to one or another of two different positions depending upon whether a train is entering or leaving said section respectively, means for shunting the rails of said section effective when said contacts are in said one position, and means for increasing the energization of said relay to cause pick-up thereof effective when said contacts are in said other position.

5. In combination, a section of railway track, a source of current connected across the rails of said section, a track relay receiving energy from said rails, means for controlling the ampere-turn energization of said track relay in such manner that normally the energization is sufficient to hold up the relay but is insufficient to cause the relay to pick up, a path for shunting the rails of said section, means for momentarily closing said path when a train enters said section, and means effective when the train leaves said section to increase the energization of said relay to cause pick-up thereof.

6. In combination, a section of railway track, a source of current connected across the rails of said section, a track relay receiving energy from the rails of said section and normally energized by current of sufficient magnitude to hold the relay up but not sufficient to cause the relay to pick up, means for closing a shunt path across the rails of said section when a train enters the section, and means including another source of current effective when the train leaves said section to increase the energization of said relay to its pick-up value.

7. In combination, a section of railway track, a source of current connected across the rails of said section, a track relay connected across the rails of said section and normally receiving energy of sufficient magnitude to hold the relay up but not sufficient to cause the relay to pick up, means for closing a shunt path across the rails of said section when a train enters the section, and means also receiving current from said source for increasing the energization of said relay to cause pick-up thereof effective when the train leaves said section.

8. In combination, a section of railway track, a track relay connected across the rails at one end of said section, a source of current connected across the rails at the other end of said section, means for limiting the energy supplied to said rails to a value above the release value of said relay but below the pick-up value of the relay, a device having one contact which becomes momentarily closed when a train enters the section and another contact which becomes momentarily closed when the train leaves the section, means including said one contact for shunting the rails of said section, and other means receiving energy from said source and including said other contact for increasing the energy supplied to said rails to cause pick-up of said track relay.

9. In combination, a section of railway track, a track relay receiving current from the rails of said section, a holding circuit for said track relay including the rails of said section and normally of such resistance as to limit the supply of current to a value sufficient to hold said track relay in its picked-up condition but insufficient to cause the relay to pick up if once released, means for momentarily closing a shunt path across the rails of said section when a train enters the section, means for momentarily decreasing the resistance of said holding circuit to permit the pick-up of said track relay effective when the train leaves said section, and a source of current connected across the rails of said section for energizing said holding circuit.

10. In combination, a section of railway track, a source of current connected across the rails of said section, a track relay and an impulse relay both receiving energy from said rails, means for controlling the ampere-turn energization of said track relay in such manner that normally the energization is sufficient to hold up the relay but is insufficient to cause the relay to pick up, means controlled by said impulse relay effective when a train enters the section to momentarily shunt the rails of said section, and other means also controlled by said impulse relay effective when a train leaves said section to momentarily increase the energization of said track relay sufficient to cause pick-up thereof.

11. In combination with a track circuit having a source of current and a track relay normally receiving current from said source of sufficient magnitude to hold the relay up but insufficient to cause said relay to pick up, an auxiliary relay also receiving current from said track circuit and having a normal condition but capable of assuming one or another of two different conditions according as a train is entering or leaving said track circuit respectively, means controlled by said auxiliary relay for shunting said track circuit when said auxiliary relay is in said one condition, and means controlled by said auxiliary relay for increasing the energization of said track relay to cause pick-up thereof when said auxiliary relay is in said other condition.

12. In combination, a section of railway track, a source of current connected across the rails at one end of the section, a track relay receiving energy from the rails at the other end of the section, means for limiting the energization of said relay to a normal value above the release value of the relay but below the pick-up value of the relay, an auxiliary relay receiving energy from said rails and having one contact which becomes closed when a train enters the section and another contact which becomes closed when the train leaves the section, means including said one contact for shunting the rails of said section, and other means including said other contact and another source of current for increasing the energization of said track relay to its pick-up value.

13. In combination, a section of railway track, a source of current connected across the rails at one end of said section, a track relay connected across the rails at the other end of said section, means for normally limiting the energization of said track relay to a value above the release value of the relay but below the pick-up value of the relay, an auxiliary relay receiving energy from said source and having one contact momentarily closed when a train enters the section and another contact momentarily closed when the train leaves the section, means including said one contact for shunting the rails of said section, and other means receiving energy from said source and including said other contact for increasing the energization of said relay to its pick-up value.

14. In combination, a section of railway track having a track relay receiving energy from the rails of said section, a holding circuit including the rails of said section and normally supplying a holding current to said relay, a pick-up circuit for said track relay also including the rails of said section, means for momentarily shunting the rails of said section when a train enters the section, means for momentarily closing said pick-up circuit when the train leaves the section, and a source of current connected to the rails of said section for said holding and said pick-up circuit.

15. In combination, a section of railway, a source of current connected across the rails of said section, a track relay connected across the rails of said section, means for normally limiting the energization of said track relay to a value above the release value of the relay but below the pick-up value of the relay, an auxiliary relay receiving energy from said source and having one contact momentarily closed when a train enters the section and another contact closed when the train leaves the section, means including said one contact for shunting the rails of said section, other means receiving energy from said source and including said other contact for increasing the energization of said relay to its pick-up value, and a slow acting device controlled by said track relay.

16. In combination, a section of railway track, a source of current connected across the rails at one end of the section, a track relay normally receiving holding energy from the rails at the other end of the section, an auxiliary relay also receiving energy from the rails at the other end of said section and having one contact which becomes momentarily closed when a train enters the section and another contact which becomes momentarily closed when the train leaves the section, means including said one contact for shunting the rails of said section, and other means receiving energy from said source and including said other contact for picking up said track relay.

17. In combination, a section of railway track, a source of current connected across the rails of said section, an auxiliary relay receiving current from said source and having a normal condition but capable of assuming one or another of two different conditions according as a train enters or leaves said section respectively, a track relay having a pick-up winding and a holding winding, said holding winding receiving energy from the rails of the section, means for closing a shunt path across the rails at said section effective when said auxiliary relay is in said one condition, and means for energizing the pick-up winding effective when said auxiliary relay is in said other condition.

18. In combination, a section of railway track, a source of current connected across the rails of the section, an auxiliary relay receiving current from the rails of said section and having a normal condition but capable of assuming one or another of two different conditions according as a train enters or leaves said section respectively, a track relay, a resistor, a holding circuit for said track relay receiving energy from the rails and including a portion only of the track relay winding and said resistor, means for closing a shunt path across said holding circuit effective when said auxiliary relay is in said one condition, a pick-up circuit for said track relay also receiving energy from the rails and including the full winding of the track relay, and means for closing said pick-up circuit effective when said auxiliary relay is in said other condition.

19. In combination, a section of railway track, a source of direct current connected across the rails of said section, a transformer the primary of which receives energy from said rails, an impulse relay receiving energy from the secondary of said transformer and having a polar armature normally in a neutral position but which moves to one position or another in response to a momentary impulse of normal or reverse polarity occasioned by a decrease or increase in the current supplied to the primary of the transformer when a train enters or leaves said section respectively, a track relay normally receiving holding energy from said rails and shunted if said polar armature occupies said one position or picked up if said polar armature occupies said other position.

20. In combination, a section of railway track, a source of direct current connected across the rails of said section, a transformer energized from said rails, an impulse relay receiving energy from a winding of said transformer and having a polar armature normally in a neutral position but which moves to one position or another in response to a momentary impulse of normal or reverse polarity occasioned by a decrease or increase in the current supplied to said transformer when a train enters or leaves said section respectively, a track relay normally receiving holding energy from the rails of said section, a path effective to shunt the rails of said section when said polar armature occupies said one position, and means including a second source of current effective to cause pick up of the track relay when said polar armature occupies said other position.

21. In combination, a section of railway track, a source of direct current connected across the rails of said section, a transformer energized from said rails, an impulse relay receiving energy from a winding of said transformer and having a polar armature normally in a neutral position but which moves to one position or another in response to a momentary impulse of normal or reverse polarity occasioned by a decrease or increase in the current supplied to said transformer when a train enters or leaves said section respectively, means effective to shunt the rails of said section when said polar armature occupies said one position, a track relay normally receiving holding energy from said source, a resistor, and means including said resistor effective to cause pick-up of said track relay when said polar armature occupies said other position.

22. In combination, a section of railway track, a source of current connected across the rails of said section, a track relay receiving energy from said rails, means for controlling the ampere-turn energization of said track relay in such manner that normally the energization is sufficient to hold up the relay but is insufficient to cause the relay to pick up, means for momentarily closing a shunt path across the rails of said section when a train enters the section, means effective when the train leaves said section to increase the energization of said relay to cause pick-up thereof, and a slow pick-up relay controlled by said track relay.

23. In combination, a section of railway track, a source of current connected across the rails of said section, means including two contacts controlled by energy received from said rails in such manner as to close one contact upon a rapid decrease in the energy received by said means occurring when a train enters said section and to close the other contact upon a rapid increase in the energy received by said means occurring when a train leaves said section, a relay receiving holding energy from said rails, means including said one contact for shunting the rails of said section to aid the release of said relay, and means including said other contact effective for aiding the pick-up of said relay.

24. In combination, a section of railway track, a source of current connected across the rails of said section, means including a contact controlled by energy received from said rails in such manner as to close said contact upon a rapid decrease in the energy received by said means occurring when a train enters said section, a track relay receiving energy from said rails, and means including said one contact for shunting the rails of said section to aid the release of said track relay.

25. In combination, a section of railway track, a source of current connected across the rails of said section, means including two contacts controlled by energy received from said rails in such manner as to close one contact upon a rapid decrease in the energy received by said means occurring when a train enters said section and to close the other contact upon a rapid increase in the energy received by said means occurring when a train leaves said section, a relay receiving holding energy from said source, means including said one contact for shunting the rails of said section, and other means including said other contact and another source of current for supplying additional energy to aid the pick-up of said relay.

26. In combination, a section of railway track, a source of current connected across the rails of said section, means including two contacts controlled by energy received from said rails in such manner as to close one contact upon a rapid decrease in the energy received by said means occurring when a train enters said section and to close the other contact upon a rapid increase in the energy received by said means occurring when a train leaves said section; a relay having two windings, one of which receives holding energy from the rails of said section; means including said one contact for shunting the rails of said section, another source of current, and other means including said other contact and other source of current for energizing said other winding for aiding said relay to pick up.

27. In combination, a section of railway track, a source of current connected across the rails of said section, a track relay receiving energy from said rails, means for controlling the ampere-turn energization of said track relay in such manner that normally the energization is sufficient to hold up the relay but is insufficient to cause the relay to pick up, a device responsive to the departure of the rear of a train from said section, and means including a contact controlled by said device for increasing the energization of said track relay to its pick-up value when the train leaves said section.

28. In combination, a section of railway track, a source of current connected across the rails of said section, a track relay receiving energy from said rails, means for controlling the ampere-turn energization of said track relay in such manner that normally the energization is sufficient to hold up the relay but is insufficient to cause the relay to pick up, a device responsive to the departure of the rear of a train from said section, and means for aiding the pick-up of said relay controlled by said device.

29. In combination, a section of railway track, a source of energy supplying current to the rails at one end of said section, a relay receiving current from the rails at the other end of said section, means also receiving current from the rails at said other end of the section and including a contact which becomes closed upon a decrease in the current received by said means occurring when a train enters said section, and means including said contact for shunting the rails at said other end of the section to aid the release of said relay.

30. In combination, a section of railway track, a source of energy supplying current to the rails at one end of said section, a relay receiving current from the rails at the other end of said section, a transformer having its primary winding also receiving current from the rails at said other end of the section, and means governed by the secondary of said transformer effective upon a decrease in the current flowing in said primary occurring when the section becomes occupied to apply a shunt across the rails at said other end of the section to aid the release of said relay.

GEORGE R. PFLASTERER.